United States Patent [15] 3,675,319

Smith [45] July 11, 1972

[54] INTERCONNECTION OF ELECTRICAL DEVICES

[72] Inventor: George Elwood Smith, Murray Hill, N.J.

[73] Assignee: Bell Telephone Laboratories, Incorporated, N.J.

[22] Filed: June 29, 1970

[21] Appl. No.: 50,780

[52] U.S. Cl. ....................29/625, 156/3

[51] Int. Cl. ....................H05k 3/06

[58] Field of Search ....................29/625; 156/3, 17; 174/68.5

[56] References Cited

UNITED STATES PATENTS

| | | | |
|---|---|---|---|
| 3,228,794 | 1/1966 | Ames | 29/625 UX |
| 3,260,634 | 7/1966 | Clark | 156/17 |

OTHER PUBLICATIONS

" Sliced Laminate, Printed Circuit Interconnections" Peter et al. IBM Tech. Disclosure Bul. Vol. 10 No. 11 Apr. 1968

*Primary Examiner*—J. Spencer Overholser
*Assistant Examiner*—Norman E. Lehrer
*Attorney*—R. J. Guenther and Arthur J. Torsiglieri

[57] ABSTRACT

At least two overlapping or crossing levels of electrically isolated conductors are used to interconnect regions of a microelectronic device. To minimize shorts at regions of overlap or crossing, the lower conductor is provided with a pronouncedly trapezoidal cross section to facilitate maintenance of a uniform thickness of insulation between the two conductors. To achieve this cross section, the lower conductor is made of a material which etches slower in the thickness direction than in the direction normal thereto. Typically the lower conductor may be a binary metal alloy whose composition varies with thickness or polycrystalline silicon whose doping or crystalline disorder varies with thickness.

6 Claims, 5 Drawing Figures

INVENTOR
G. E. SMITH
BY
Arthur J. Torsiglieri
ATTORNEY

INTERCONNECTION OF ELECTRICAL DEVICES

This invention relates to the provision of circuit connections to electronic apparatus with particular reference to microelectronics.

In microelectronics, it is important to provide a high density of conductive paths in relatively small spaces. Advantageously such conductive paths are provided in layers overlying a supporting substrate and there arises a necessity for the conductive paths in different layers to overlap or cross over one another while maintaining electrical isolation.

Typical is the problem of providing a number of interconnections, either d-c or capacitive, to different circuit elements in a monolithic integrated circuit. Closely related is the problem of making separate connections to two closely spaced regions where it is found desirable to have one connection overlap the edge of the other connection although maintaining electrical isolation therefrom.

BACKGROUND OF THE INVENTION

A popular method for achieving a desired interconnection pattern in the integrated circuit art involves first forming a continuous conductive layer over the semiconductive wafer, typically electrically isolated therefrom over most of the surface by an intermediate insulating layer but making connection thereto at selected regions by openings or thickness reductions in the insulating layer. Portions of the conductive layer are then selectively removed to form the first conductive pattern or first level of metallization. Then, after providing an insulating layer over this conductive pattern with appropriate openings or regions of reduced thickness in all the insulation where connection to the wafer or the first pattern is desired, a second continuous conductive layer is deposited and selected portions thereof are thereafter removed to form the second conductive pattern or second level of metallization.

Interconnection patterns formed in this way too often exhibit defects localized at the regions where the one of the two conductive patterns crosses over the other.

One object of my invention is to reduce the incidence of such defects.

SUMMARY OF THE INVENTION

To this end, in one aspect, my invention is a process which results in a first conductive pattern in which the conductor edges are free of abrupt discontinuities whereby a more uniform layer of insulating material may be formed thereover before deposition thereover of the second conductive pattern. In the preferred embodiment, this is achieved by utilizing for the first conductive pattern a conductor which will exhibit an anisotropic etch rate. Such is characteristic of, e.g., highly conductive polycrystalline silicon whose thickness includes a profile in disorder, the disorder decreasing with increased depth from the top.

BRIEF DESCRIPTION OF THE DRAWING

The invention will be more fully understood from the following more detailed description taken in conjunction with the accompanying drawing in which.

DETAILED DESCRIPTION

Figure 1:
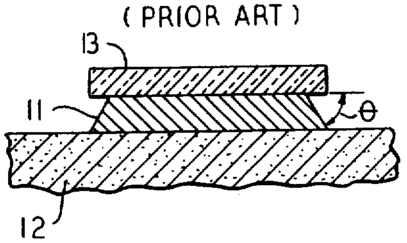
FIG. 1 (PRIOR ART)
FIG. 1 illustrates the relatively abrupt discontinuities at the edges of a conductive pattern when the usual prior art process is employed.

With reference now to the drawing, FIG. 1 shows the essentially rectangular cross section of a conductor 11 of the conductive pattern formed on a substrate 12 when the prior art practice is employed for forming the pattern. There is shown the photoresist mask 13 used to localize the removal of the unwanted portion of the original uniform conductive layer during etching. Typically some undercutting during etching occurs but the angle $\theta$ is at least 45°. This angle is still quite large and when an insulating layer is deposited over the edge portions there tends to be created defects in the insulating layer at such regions.

Figure 2:
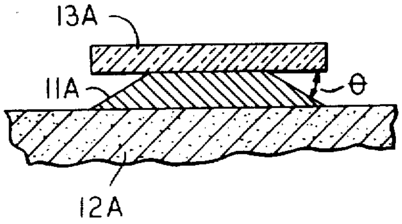
FIG. 2 illustrates the more gradual transition in thickness at the edges of a conductive pattern when a process in accordance with the invention is employed.

To minimize such defects it is proposed to achieve a more pronouncedly trapezoidal cross section of the conductive pattern 11A on the substrate 12A as shown in FIG. 2. In particular, advantageously provision is made to achieve an angle $\theta$ with the mask 13A which is no greater than about 30° so that a more uniform insulating layer can be deposited over the edge portions.

Moreover, the removal of abrupt edge portions is advantageous even when the insulating layer used to provide isolation from an overlying second conductive pattern is formed as a genetic layer formed by conversion in situ of a skin portion of the first conductive layer. In this case the principal advantage arises from the fact that there is made possible a more uniform deposition of the photoresist material normally used in forming contact holes in the insulating layer.

As may be appreciated from FIG. 2, this desired cross section of the conductor can be obtained by providing greater undercutting of the mask, as would be achieved by providing that the etch rate be faster in the plane of the layer than in its thickness dimension. Such a gradient or anisotropy in etch rate can be realized in a variety of ways. For example, the conductor 11A may be made to etch faster on top than on the bottom as a result of a composition gradient. Such a composition gradient can be realized by coevaporation of two metals such that the resulting alloy has a gradient in the relative compositions of the two metals with thickness, the less etch-resistant metal forming a larger part of the composition at the top than at the bottom. Alternatively the conductor 11A may comprise a conductive polycrystalline semiconductor and the anisotropy in etch rate achieved by a profile in crystalline disorder produced either by ionic bombardment or deposition conditions, use being made of the fact that the more disordered material can be made to etch faster than more ordered material.

Figure 3A:
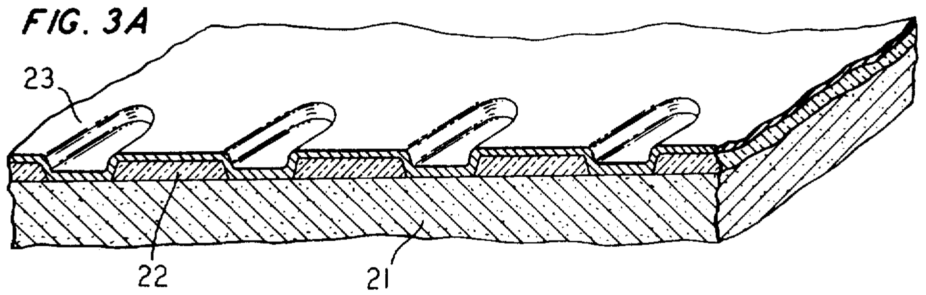
FIG. 3A through 3C illustrates an exemplary process in accordance with the invention for providing two levels of conductive patterns on a semiconductive wafer.

An illustrative example of a process in accordance with the present invention will be discussed in connection with FIG. 3A through 3C which show successive stages in the formation of a portion of an interconnection pattern of a monolithic silicon integrated circuit. For better exposition, the drawing is not to scale. In FIG. 3A there is shown a silicon wafer 21 which normally includes therein a plurality of circuit elements (not individually shown), which are largely isolated from one another internally by known p-n junction isolation techniques and which are to be interconnected primarily by conductive films on the surface of the wafer. In particular, various openings are provided in the oxide-coating 22 to permit a conductive layer 23 on the surface to make d-c electrical connection to the wafer at such regions. Alternatively, if a capacitive electrical connection is to be made, the insulating layer is merely thinned at regions where such connection is desired. There then remains the problem of interconnecting the regions in a desired fashion to interconnect thereby the circuit elements. In the interest of simplicity, there is being described herein in detail only this portion of the fabrication. There is a variety of techniques now being practiced commercially which can provide an oxide-coated silicon wafer of the kind shown in FIG. 3A which includes on a common surface a plurality of regions which need to be interconnected.

The conductive layer 23 is chosen to etch anisotropically, and in particular to etch in the direction of the plane of the layer faster than in the direction normal thereto. This end can be realized in a variety of ways. For example, the conductive layer may be formed by codepositing two metals, the ratio of the two changing with time during the deposition to provide a composition gradient with thickness in the layer deposited. As an illustrative example, the layer may be composed of copper and gold, and the material initially deposited being predominantly gold, and the proportions of the two shifted with time till the final material deposited will be predominantly copper. There is then used an etch which etches faster the greater the copper content. As another example, the conductive layer deposited may be of polycrystalline silicon doped to be highly conductive, the deposition conditions being such that the material initially deposited is relatively well ordered but that with increasing time the amount of disorder in the material deposited increases. This can be achieved for example by decreasing with time the temperature of the substrate as the silicon is being deposited. Alternatively, a uniform polycrystalline layer may be deposited and the disorder introduced to the top of the layer by ion bombardment. As another alternative, the layer may be highly conductive p-type silicon whose doping is higher the nearer the surface.

After formation of the conductive layer, there needs to be removed the excess material to define the desired first conductive pattern. This can be done in the manner now used in the integrated circuit art and typically involves photolithographic techniques the end product of which is the formation of an etch-resistant mask over the conductive layer conforming to the conductive pattern desired for this first level of metallization.

Figure 3B:
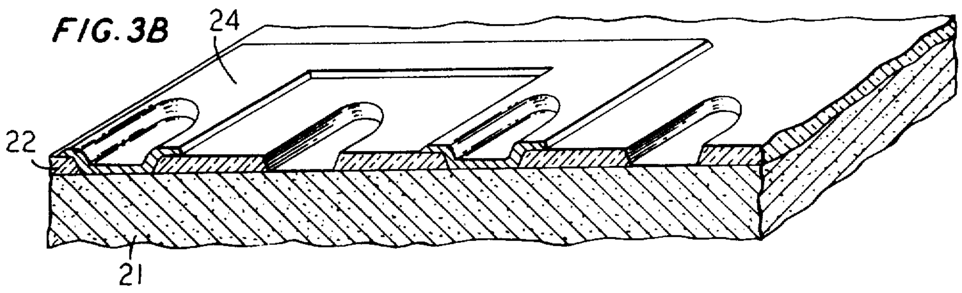
Figure 3C:
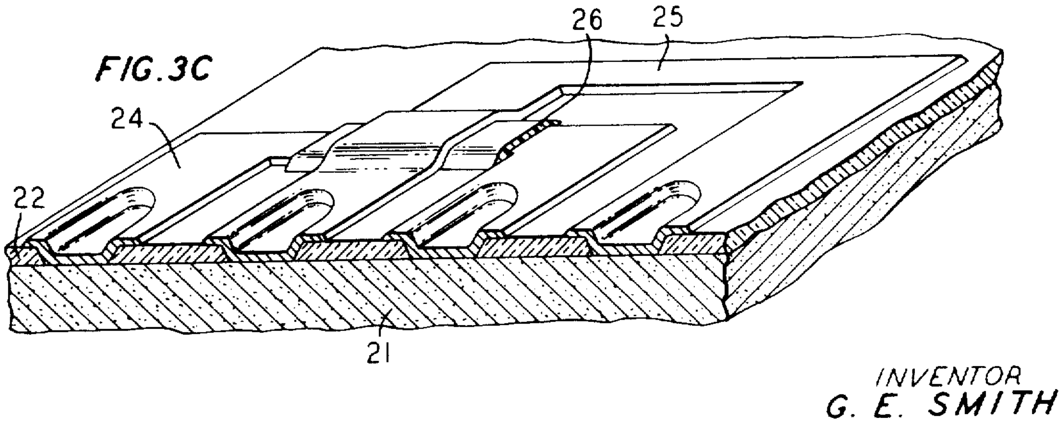

Next the masked wafer is exposed to an etch which will etch in the desired anisotropic fashion the conductive layer and leave on the surface the desired first conductive pattern 24 as shown in FIG. 3B.

For the example involving the binary composition layer of copper and gold described above, an aqueous solution of ferric chloride or an aqueous solution of 70 percent nitric acid is a suitable etchant. For the example described involving disordered polycrystalline silicon, a suitable etchant comprises a mixture which by volume is three parts a 48 percent aqueous solution of hydrofluoric acid, five parts a 70 percent aqueous solution of nitric acid, 3 parts of glacial acetic acid and 2 parts of a 3 percent aqueous solution of mercurous nitrate. Actually, there is known from use in metallographic studies a large number of etchants which etch damaged material faster than ordered material. Moreover, an etchant for etching p-type silicon anisotropically is described in a paper entitled "A Water-Amine Complexing Agent System for Etching Silicon," appearing at pages 965–970 of the Sept. 1067 issue of the *J. Electrochem. Soc.: Solid State Science.*

The etching is continued until the oxide layer is reached at the exposed portions of the conductive layer. The anistropic etching will result in appreciable undercutting of the mask to provide tapered edges to the conductor remaining unetched forming the first conductive pattern. As shown in FIG. 2, the cross section of the conductor will have a pronouncedly trapezoidal shape although there will be some rounding at the corners.

Thereafter, the mask is removed in the normal fashion, and a layer of insulating material, which typically may be silicon dioxide is deposited over the surface of the wafer to cover the conductive pattern and to permit formation of a second conductive pattern insulated from the first. It can be appreciated that the use of tapered edges for the conductor forming the first conductive pattern permits this layer of insulating material to be deposited more uniformly over the conductor.

In some cases, it may be advantageous to form the insulating layer by conversion in situ of a top portion of the conductive pattern. For example, if the first pattern formed is of silicon, heating in an oxidizing atmosphere in the usual manner can be used to form an insulating layer thereover. In this instance, the tapered edge will prove advantageous in the subsequent uniform deposition of the photoresist layer normally used to control the shaping of the insulating layer over the first layer of metallization and again serve to reduce the likelihood of defects in the overlap or crossover region.

There then needs to be formed the second level of conductive pattern desired.

First, if this pattern is to make electrical connection to the semiconductive wafer, either direct or capacitively, appropriate openings or thinning of the insulating layers over the wafer are first provided at the regions desired for connection. This advantageously can be one by the usual photolithographic techniques and so will not be described in detail.

After the appropriate openings have been provided, there is deposited advantageously a continuous conductive layer. If the desired interconnection pattern necessitates another conductor overlapping or crossing over the second pattern, the layer advantageously can be of the kind deposited initially for forming the first conductive pattern. However, if it will be unnecessary to form additional crossing or overlapping patterns, this second conductive pattern can be formed in conventional manner using normal materials. Thereafter, in any case usual photolithographic techniques are used to remove excess material from this second continuous layer to leave behind the desired conductive pattern 25, insulated from the first conductive pattern 24 by an insulating layer 26, as seen in FIG. 3C. In the interest of simplicity, the full extent of insulating layer 26 is not shown.

The invention also has applicability to the formation of a conductive path which does not completely cross over an underlying conductor but merely overlaps, although maintaining electrical isolation. This situation arises typically where it is advantageous to make separate connections either direct or capacitive to two closely spaced regions of a semiconductive wafer as arises for example in some forms of insulated gate field effect transistors or charge coupled devices.

It should be evident that the basic principles of the invention can be extended to any form of microcircuit involving multilayer interconnection patterns, such as thin- and thick-film circuits involving simply resistances and capacitances, and functional circuits such as charge-coupled devices involving primarily capacitive connections to a semiconductive wafer. The invention even may have applicability to magnetic microcircuits when the need arises for multilayer interconnections.

It should also be evident that a wide variety of sequences of steps may be devised without departing from the spirit and scope of the invention, the essence of which is the formation in an appropriate manner of a substantially trapezoidal cross section of a conductor which is to be coextensive in part with another conductor while maintaining essentially electrical isolation.

There is being filed contemporaneously with this application, application Ser. No. 50,779 in the name of P. V. D. Wilde and assigned to the common assignee which relates to a different solution to the crossover problem in interconnection patterns.

What is claimed is:

1. A process for forming patterns of electrical conductors on a substrate for microelectronic apparatus comprising the steps of forming on the substrate to be interconnected a first conductive layer of a material which exhibits, in an appropriate etchant, a faster etching rate in a direction of the plane of the layer rather than in the direction normal thereto, providing an etch resistant mask over such layer to define a first conductive pattern, etching the layer in an etchant which etches the conductive layer faster in the direction of the plane of the layer than in the direction normal thereto to form the first conductive pattern on said substrate, forming an insulating layer over said substrate, and forming a second conductive pattern on said substrate partially coextending over the first conductive pattern.

2. A process in accordance with claim 1 in which the first conductive layer is of a binary alloy whose composition varies with thickness of the layer to provide an anisotropic etching rate.

3. A process in accordance with claim 1 in which the first conductive layer is polycrystalline and the lattice disorder varies with thickness to provide an anisotropic etching rate.

4. A process in accordance with claim 1 in which the first conductive layer is of a polycrystalline semiconductive material in which the conductivity varies with thickness to provide an anisotropic etching rate.

5. A process in accordance with claim 1 in which the substrate is an oxide-coated silicon crystal and the first conductive layer is of polycrystalline silicon.

6. A process for forming a multilevel pattern of conductive paths on a semiconductive device comprising the steps of forming an oxide-coated silicon wafer a conductive layer making electrical connection to the wafer at selected regions, the conductive layer being of a material which exhibits in a suitable etchant an etching rate faster in the plane of the layer than in a direction normal thereto, forming an etch resistant mask over the conductive layer corresponding to a desired first conductive path, exposing the wafer to one of said etchants for removing excess conductive material, the remaining material corresponding to the first conductive path, forming an insulating layer over the first conductive path, forming a conductive layer over the insulating layer, making electrical connection to the wafer at selected regions, and selectively removing material from said last-mentioned layer to define a second conductive path.

* * * * *

UNITED STATES PATENT OFFICE

CERTIFICATE OF CORRECTION

Patent No. 3,675,319 Dated July 11, 1972

Inventor(s) George E. Smith

It is certified that error appears in the above-identified patent and that said Letters Patent are hereby corrected as shown below:

Column 3, line 45, after "Sept." delete "1067" and insert --1967--;

line 70, after "subsequent" insert --processing. In particular, it will facilitate subsequent--.

Column 4, line 5, change "one" to --done--.

Column 5, line 10, after "forming" insert --on--.

Signed and sealed this 26th day of December 1972.

(SEAL)
Attest:

EDWARD M.FLETCHER,JR.
Attesting Officer

ROBERT GOTTSCHALK
Commissioner of Patents